(12) United States Patent
Yamamoto et al.

(10) Patent No.: US 6,771,426 B2
(45) Date of Patent: Aug. 3, 2004

(54) INPUT-OUTPUT OPTICAL SYSTEM OF SPATIALLY OPTICAL COUPLED TYPE, AND OPTICAL SWITCH

(75) Inventors: Tsuyoshi Yamamoto, Kawasaki (JP); Tamotsu Akashi, Kawasaki (JP); Shinichi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/342,301

(22) Filed: Jan. 15, 2003

(65) Prior Publication Data

US 2003/0231831 A1 Dec. 18, 2003

(30) Foreign Application Priority Data

Jun. 18, 2002 (JP) .................................... 2002-177043

(51) Int. Cl.[7] ...................... G02B 27/30; G02B 27/10; G02B 6/26; G02B 6/32; G02B 6/38
(52) U.S. Cl. ...................... 359/641; 359/619; 359/621; 385/18; 385/31; 385/33; 385/39; 385/47; 385/74; 385/89
(58) Field of Search ................................ 359/641, 621, 359/619, 618; 385/18, 31, 33, 39, 42, 47, 52, 74, 89

(56) References Cited

U.S. PATENT DOCUMENTS 6,044,705 A   4/2000   Neukermans et al. .... 73/504.02

| 6,429,976 | B1 |   | 8/2002  | Yamamoto et al. ......... 359/641 |
| 6,549,691 | B1 | * | 4/2003  | Street et al. .................. 385/18 |
| 6,556,743 | B2 | * | 4/2003  | Kim et al. ..................... 385/24 |
| 6,636,664 | B2 | * | 10/2003 | Snyder et al. ................ 385/36 |
| 6,658,180 | B2 | * | 12/2003 | Xie et al. ...................... 385/33 |
| 6,671,428 | B1 | * | 12/2003 | Yang et al. .................... 385/18 |
| 2003/0081908 | A1 | * | 5/2003  | Gage et al. |

FOREIGN PATENT DOCUMENTS

| JP | HEI 8-220405 | 8/1996 |
| JP | P2002-169107 | 6/2002 |
| WO | WO 00/20899 | 4/2000 |

OTHER PUBLICATIONS

Neilson, D.T., et al., "Fully Provisioned 112×112 Micro–Mechanical Optical Crossconnect With 35.8Tb/s Demonstrated Capacity," Optical Fiber Communications Conference (OFC 2000), pp. PD12–1/202 through PD12–3/204.

* cited by examiner

*Primary Examiner*—Loha Ben
(74) *Attorney, Agent, or Firm*—Staas & Halsey, LLP

(57) ABSTRACT

In an input-output optical system of spatially optical coupled type, a spacer is provided in at least one of input and output optical systems and interposed between a lens array block and a fiber block without blocking an optical path for ensuring a distance corresponding to a focal distance of collimating lenses. As a result, highly-accurate, highly-stable alignment of an optical axis can be readily realized.

19 Claims, 14 Drawing Sheets

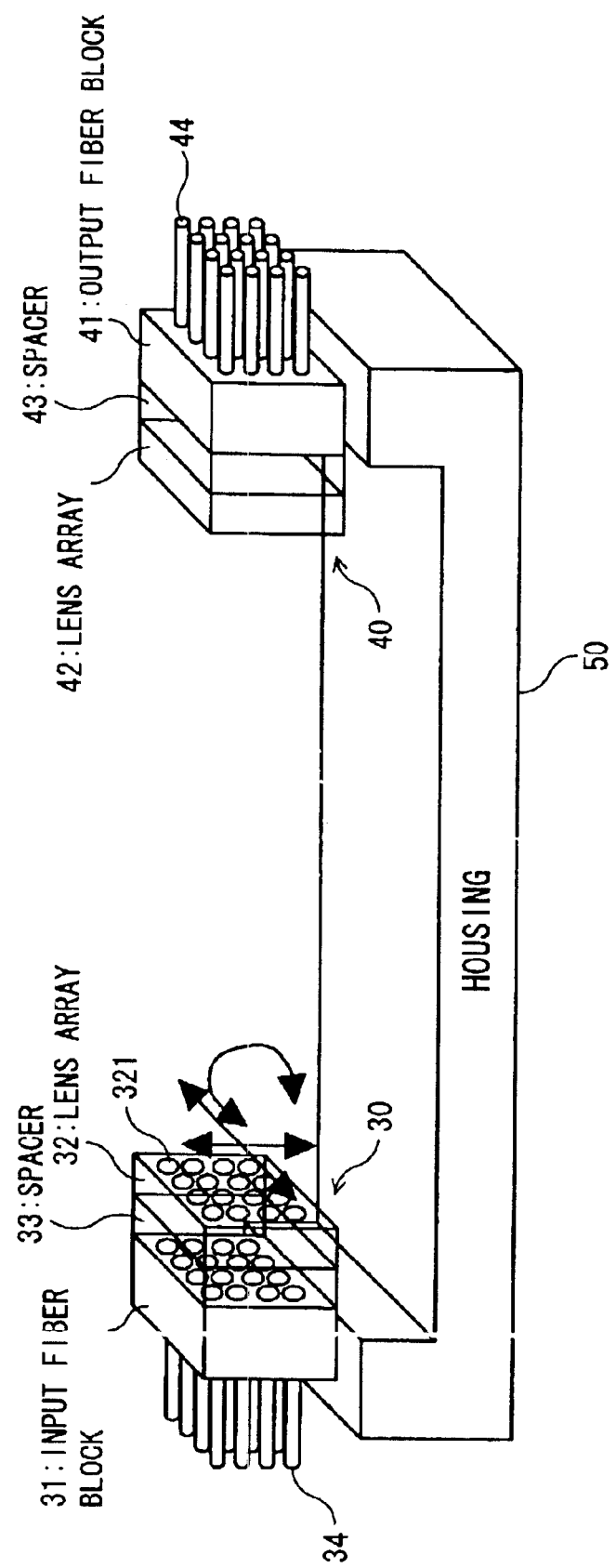

C-SHAPED SPACER

TRANSPARENT SPACER

MATCH EXISTS BETWEEN COEFFICIENT OF THERMAL EXPANSION OF FIBER BLOCK AND THAT OF LENS ARRAY

NO MATCH EXISTS BETWEEN COEFFICIENT OF THERMAL EXPANSION OF FIBER BLOCK AND THAT OF LENS ARRAY

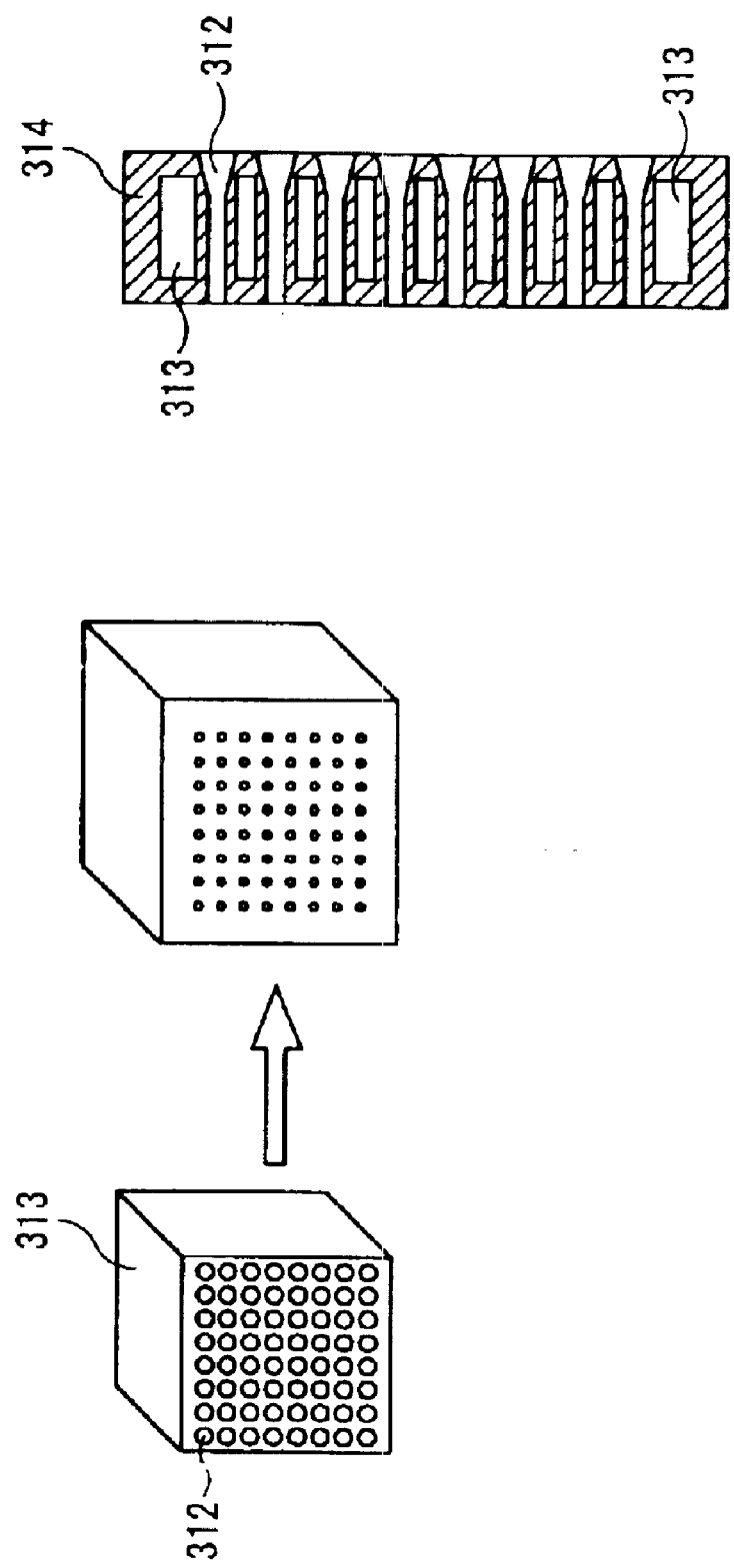

PLACE INSERT MEMBER IN MOLD

INSERTION OF MOLDING PIN

RESIN MOLDING

F I G. 13
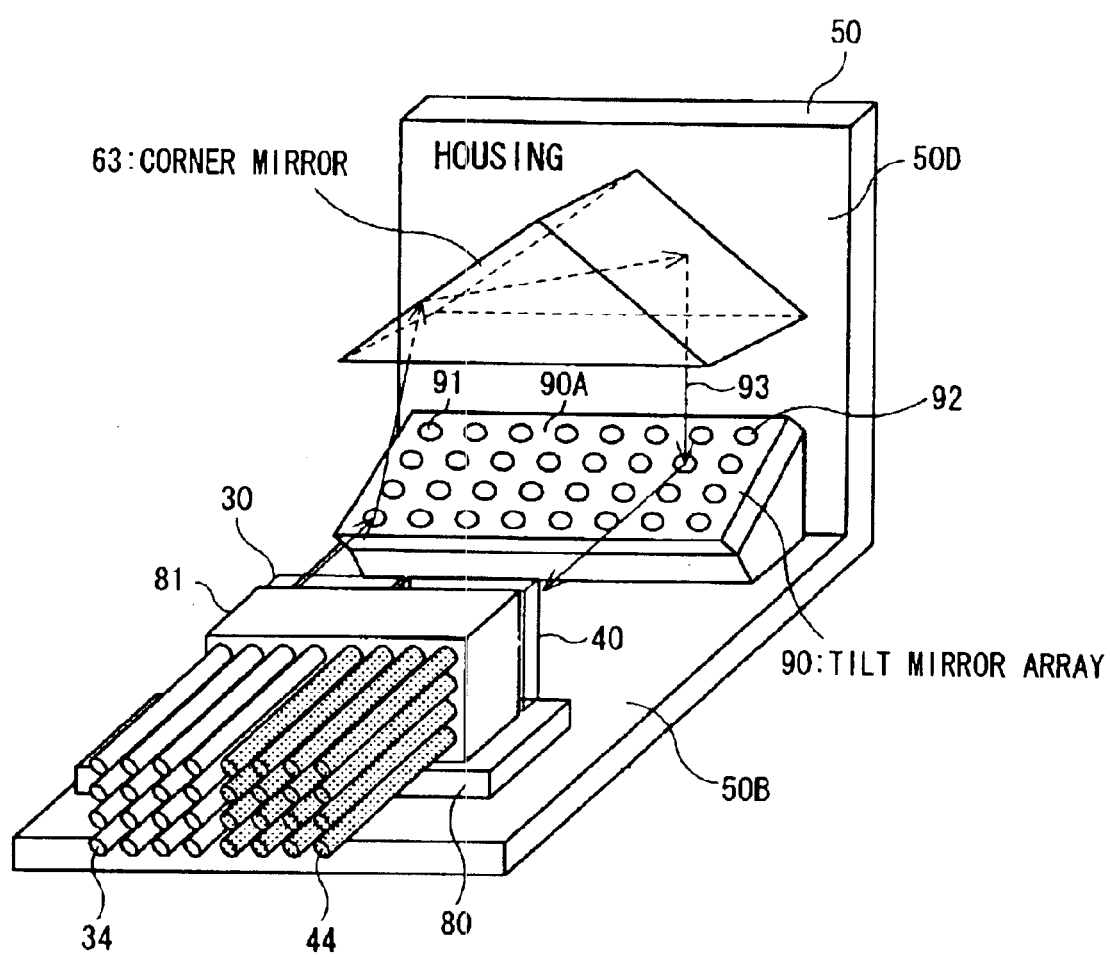

INPUT-OUTPUT OPTICAL SYSTEM OF SPATIALLY OPTICAL COUPLED TYPE, AND OPTICAL SWITCH

BACKGROUND OF THE INVENTION (1) Field of the Invention

The invention relates to an input-output optical system of spatially optical coupled type which is suitable for use in effecting optical coupling between an input and an output by sending and receiving light beam in a space without use of an optical fiber connection, as well as to an optical switch of spatially optical coupled type having the input-output optical system.

(2) Description of the Related Art

In association with recent speedup of an optical signal flowing through a trunk cable system, there arises a necessity for even an optical switch, such as an optical cross-connect device, to handle a high-speed optical signal having a speed exceeding 10 Gbps (gigabits per second). As a result of an increase in the number of wavelengths to be multiplexed (currently up to thousands of channels), a required scale of optical switching is becoming massive.

Against such a background, development of an optical switch of spatially optical coupled type using a micro tilt mirror array to which a micro electromechanical system (MEMS) is applied has recently been pursued as a technique for rendering the scale of an optical switch larger. There are available optical switches such as that described in, e.g., "Fully-provisioned 112×112 micro-mechanical optical cross-connect with 35.8T b/s demonstrated capacity" by D. T. Neilson et al., Optical Fiber Communications Conference (OFC 2000), Post-deadline paper PD-12, March 2000," or that described in Published International Publication WO 00/20899. In relation to a micro tilt mirror using a MEMS, a technique proposed in, e.g., U.S. Pat. No. 6,044,705, has already been known.

In an optical switch of spatially optical coupled type using a mirror, an input-output optical system becomes important, wherein signal light having propagated through an (input) optical fiber is output into a space as a collimated beam, and the beam is subjected to processing, such as switching, through use of a micro tilt mirror. Then, the beam again enters an (output) optical fiber. For this reason, a technique for easily manufacturing a highly-accurate, stable input-output optical system is sought for commercializing a large-scale optical switch.

A conventional input-output optical system will now be described.

FIG. 17 schematically shows an example of three-dimensional mount structure of a conventional input-output optical system. The input-output optical system shown in FIG. 17 has a predetermined substrate 100; a pair of optical systems (optical transmission units) 200 mounted thereon with bolts or the like; i.e., one optical system for input and the other optical system for output (hereinafter, an input optical system 200 is sometimes denoted as an input optical system 200a, and an output optical system 200 is sometimes denoted as an output optical system 200b), each optical system being constituted by combination of a collimator lens 201 and a fiber block 202; an attachment member 300a on which the optical system 200a is to be mounted with bolts or the like; and an attachment member 300b on which the optical system 200b is to be mounted with bolts or the like. Here, illustration of an optical switch mechanism is omitted from FIG. 17. Here, the fiber block 202 is for housing a plurality of optical fibers in the form of an array.

In the input-output optical system having such a construction, in order to accurately align a light exist surface of the input optical system 200a to a light incidence surface of the output optical system 200b (i.e., to accurately align optical axes of the respective optical systems 200 with each other), an optical axis is aligned in a three-dimensional direction by means of individually adjusting mount positions and orientations (angles) of the optical systems 200 and those of the attachment members 300a, 300b.

However, such a three-dimensional optical axis alignment requires alignment of six axes; that is, alignment of a longitudinal axis, alignment of a lateral axis, alignment of an optical axis, alignment of rotation around an optical axis, alignment of rotation around the longitudinal axis, and alignment of rotation around the lateral axis. Hence, an extremely large number of processes are required for assembling the input-output optical system. As described in, e.g., Japanese Patent Application Laid-Open No. 220405/1996, repetition of the following steps is required; namely, a step of fastening the attachment members 300a, 300b and the respective optical systems 200 with bolts, a step of detecting optical axes, and a step of temporarily loosening the bolts if no match exists between the optical axes and adjusting the mount positions and angles of the optical systems 200 and those of the attachment members 300a, 300b. Hence, adjustment of optical axes requires consumption of much time. For this reason, an improvement in manufacturing yield is not expected, resulting in high product costs.

Proposed in the aforesaid patent publication 220405/1996 is an optical transmission unit 2 such as that shown in FIGS. 18A and 18B. FIG. 18A is a front view of the optical transmission unit 2, and FIG. 18B is a transverse plan view of the optical transmission unit 2.

In the optical transmission unit 2, the amount of fastening of respective fastening screws 19 is adjusted individually through use of the three mount screws 19 and three springs (compression coil springs) 20, thereby adjusting the angle of an outgoing beam (i.e., a beam into which the light output from a light-emitting element 5 is collimated by a collimator lens 3).

In FIGS. 18A and 18B, reference numeral 4 designates a polarization beam splitter; 5 designates a light-emitting element; 6 designates a light-receiving element; 7 designates an optical axis; 11 designates a main body frame; 9 designates a front frame of the main body frame 11; 9a designates an attachment hole formed in the front frame 9; 9b designates screw holes; 14 designates a cylindrical section inserted into the attachment hole 9a so that the angle of the cylindrical section can be displaced; 16 designates a flange; 15 designates an attachment hole by which it is formed in the flange 16 perimeter at intervals of 120 degrees, and the screw 19 is inserted; 17 designates a cylinder; 18 designates an element unit formed by attaching the polarization beam splitter 4, the light-emitting element 5, and the light-receiving element 6 to the cylinder 17; and 19a designates the head of a mount screw 19.

Under the foregoing known technique, adjustment of an optical axis becomes easier than that shown in FIG. 17. However, use of the springs 20 results in unstable fastening of the unit, which may cause an unexpected offset in an optical axis. Further, an offset may arise in an optical axis for reasons of long-term variations in elastic moduli of the springs 20. Therefore, the known technique is insufficient in terms of accuracy and reliability (stability) of adjustment of an optical axis.

SUMMARY OF THE INVENTION

The invention has been conceived in light of such a drawback and aims at providing an input-output optical system of spatially optical coupled type and an optical switch, which enable highly accurate, highly stable, and easy alignment of an optical axis.

To achieve the object, the invention provides an input-output optical system of spatially optical coupled type comprising:

a substrate;

an input optical system which is provided on the substrate and which has an input fiber block and an input lens array block, wherein a plurality of input optical fibers are connected to the input fiber block in an array, and a plurality of collimating lenses which collimate light input from the optical fibers connected to the input fiber block and output collimated light are arranged in the input lens array block in an array;

an output optical system which is provided on the substrate and which has an output lens array block and an output fiber block, wherein a plurality of collimating lenses which collimate respective light rays output from the input lens array block are arranged in the output lens array block in an array, and an output fiber block to which a plurality of output optical fibers are connected in an array and which output the light output from the output lens array block to the output optical fibers; and a spacer which is interposed between the lens array block and the fiber block in at least one of the input and output optical systems without blocking an optical path for ensuring a distance corresponding to a focal distance of the collimating lenses and a distance of the optical path.

By means of such a configuration, in the input-output optical system of the invention, a distance corresponding to a focal distance of the collimating lenses is provided between the lens array block and the fiber block without posing hindrance to an optical path, by means of the spacer. Hence, alignment of the input-output optical system in an axial direction becomes unnecessary, and hence alignment of an optical axis is achieved through a two-dimensional positional adjustment within a single plane.

Therefore, alignment of an optical axis which is more accurate and stable than conventional alignment of an optical axis can be easily implemented.

Here, the spacer is preferably formed from a plate-like transparent member which has a thickness corresponding to the focal distance and the distance of the optical path in a direction of the optical path and allows transmission of the light. In this case, the plate-like transparent member preferably has an optical refractive index corresponding to that of the input optical fibers or that of the output optical fibers, and the lens array block and the fiber block are preferably cemented together with an adhesive having the same refractive index as that of the optical index. As a result, the optical path is not hindered, and the amount of light reflected from a cemented portion can be reduced.

Further, the plate-like transparent member maybe formed by combination of a plurality of transparent plates having wedge-shaped side surfaces such that a thickness in the direction of an optical path is changed as a result of sliding of the transparent plates. By means of such a configuration, alignment of an optical path (i.e., adjustment of the distance of an optical path) can be effected readily and with high precision.

Accordingly, the distance between the optical fibers and the collimating lenses can be adjusted readily and with high precision.

The spacer may be formed from a plate-like member which has a thickness corresponding to the focal distance and the distance of the optical path in a direction of the optical path, so as to avoid hindering the optical path in accordance with the arrangement of the collimating lenses. Even in the case of such a configuration, alignment of an optical axis (i.e., adjustment of distance of an optical path) becomes unnecessary, and hence the only requirement is to perform two-dimensional alignment of an optical axis within a single plane.

Moreover, the space may be embodied as any space, so long as it does not hinder an optical path. For instance, the space may be embodied as a plate-like transparent member which transmits light or is formed into a shape so as to avoid hindering an optical path. When the transparent path is employed, the spacer preferably has an optical refractive index corresponding to the optical refractive index of the optical fibers. The lens array block and the fiber block are preferably cemented together with an adhesive having the same refractive index as the optical refractive index. As a result, an optical loss or reflection which would arise in cemented surfaces can be reduced.

The substrate and the fiber block may be provided with positioning means for fixing the fiber block at a predetermined position on the substrate.

As a result, the fiber block can be fixed at a predetermined position after having been positioned readily and with high accuracy.

Further, a return mirror may further be provided on the substrate for shifting light output from the input optical system to a predetermined direction, thus reflecting the light. In this case, the input optical system and the output optical system can be assembled into a single input-output-integrated block such that a surface of the input optical system by way of which the light is output and a surface of the output optical system by way of which the light reflected by the return mirror enters are located within a single plane. As a result, there is obviated a necessity for individually positioning the input and output optical systems.

Accordingly, easier, highly accurate mounting of input and output optical systems becomes feasible.

Here, the return mirror may be fittingly fixed at a predetermined position on the substrate. This also enables easy positioning (fixing) of the return mirror, and hence easier mounting of the input-output optical system becomes feasible.

Further, the input-output-integrated block may be provided with a positioning member for temporarily positioning the return mirror and the input-output-integrated block on the substrate, and positioning means to be fixed at a predetermined position. By means of such a configuration, there is obviated a necessity for individually positioning the return mirror and the input-output-integrated block.

Accordingly, the return mirror and the input-output-integrated block can be positioned and fixed more easily with higher accuracy.

If the fiber block and the lens array block are formed from materials having equal coefficient of thermal expansion, there is suppressed occurrence of an offset in relative positions which would be caused by a temperature difference between the fiber block and the lens array block attributable to a difference in coefficient of thermal expansion. A positional relationship between the centers of the optical fibers and the centers of the lenses can be made constantly regardless of temperature, thereby enabling a reduction in temperature variations of the angle of the light output from the input optical system. Hence, an input optical system which is very stable against thermal variations can be realized.

Moreover, the fiber block is constituted of a metal insert member and resin material. A plurality of holes corresponding to the arrangement of optical fibers are formed in the metal insert member, and the metal insert member has the same coefficient of thermal expansion as that of the lens array block. The resin material covers the insert member. In this case, the fiber block having a coefficient of thermal expansion equal to that of the lens array block can be readily prepared.

A spatial optical switch of the invention is characterized by comprising the foregoing input and output optical systems and a tilt mirror array block for effecting switching of an optical path existing between the input optical system and the output optical system. As a result, even in the spatial optical switch of the invention, a distance corresponding to the focal distance of the collimating lens is assured between the lens array block and the fiber block without posing a hindrance to an optical path by means of the spacer. Hence, alignment of the optical switch in an axial direction (i.e., adjustment of distance of an optical path) becomes unnecessary, and hence the only requirement is two-dimensional adjustment of an optical axis.

Therefore, an optical switch of spatially optical coupled type which is easy to assemble and enables easy and highly accurate alignment of an optical axis can be realized, thereby enabling an attempt to reduce the cost of such an optical switch.

BRIEF DESCRIPTION OF THE DRAWINGS

FIG. 1 is a view schematically showing the configuration of an input-output optical system of spatially optical coupled type which serves as an embodiment of the invention;

FIGS. 11A through 11C are schematic representations for describing the structure of the fiber block of the embodiment;

FIG. 13 is a schematic perspective view showing the configuration of an optical switch of spatially optical coupled type using the input-output optical system of the embodiment;

DESCRIPTION OF THE PREFERRED EMBODIMENT

Figure 2A:
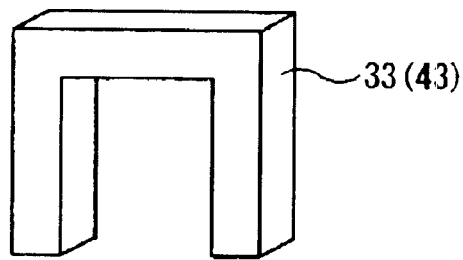
FIG. 2A is a schematic representation showing an example of C-shaped spacer to be used in the input-output optical system of the embodiment.

An embodiment of the invention will be described hereinbelow by reference to the accompanying drawings.

(A) Description of an Input-Output Optical System of Spatially Optical Coupled Type FIG. 1 is a view schematically showing the configuration of an input-output optical system of spatially optical coupled type according to an embodiment of the invention. The input-output optical system shown in FIG. 1 comprises a housing (substrate) 50, an input optical system 30, and an output optical system 40. A light-output surface of the input optical system 30 and a light-input surface of the output optical system 40 are opposed to each other on the housing 50, whereby the light output from the input optical system 30 propagates through space and is received by the output optical system 40.

For this reason, the input optical system 30 (input collimator) is provided with an input fiber block 31 and a lens array block 32. A plurality of optical fibers (input optical fibers) 34 are to be connected to the input fiber block 31 in an arrayed pattern. A plurality of collimating lenses 321—which collimate light beams having entered by way of the respective input optical fibers 34 and output the thus-collimated light beams—are arranged in an arrayed pattern so as to match the arrangement of the input optical fibers 34. In the embodiment, a spacer 33 is interposed between the blocks 31, 32.

Similarly, the output optical system (output collimator) 40 is provided with an output fiber block 41 and a lens array block 42. A plurality of optical fibers (output optical fibers) 44 are connected to the output fiber block 41 in an arrayed pattern. A plurality of collimating lenses 321 are arranged in the lens array block 42 in an arrayed pattern so as to match the arrangement of output optical fibers 44, and receive the light beam output from the input optical system 30 (hereinafter often called collimated light beam) and output the thus-received light beam to an output optical fiber 44 connected to the output fiber block 41. A spacer 43 is interposed between the blocks 41, 42.

As shown in FIG. 1, the spacer 33 (43) has a predetermined thickness in the direction of an optical axis between the input optical system 30 and the output optical system 40. The spacer 33 is cemented to the fiber block 31 (41) and the lens array block 32 (42) with an adhesive.

Here, since the light beam is to be collimated by the lens array block 32 (42), fiber-lens spacing determined by focal distances of the collimating lenses 321 and a propagation distance of the light beam requires high precision. Here, the thickness of the spacer 33 (43) is adjusted by means of high-precision abrasion or the like. Since an optical path must be assured between the optical systems 30 and 40 (or the fiber blocks 31 and 41), a U-shaped block having the shape of the letter U (U-shaped spacer; a plate member formed so as to avoid an optical path in accordance with the arrangement of the collimating lenses 321), as schematically shown in, e.g., FIGS. 2A and 2B, and a transparent plate (transparent spacer; plate-like transparent member) for allowing transmission of beam light are applied to the spacer.

In this way, the lens array block 32 (42) and the fiber block 31 (41) are fixed while being spaced apart from each other by a distance computed from the focal distance of the collimating lenses 321 used for the lens array block 32 (42), by means of the spacer 33 (43). According to such a structure, the interval between the lens array block 32 (42) and the fiber block 31 (41) in the direction of the optical axis is determined by the thickness of the spacer 33 (43), thereby obviating a necessity for positional alignment in the direction of the optical axis.

Figure 3:
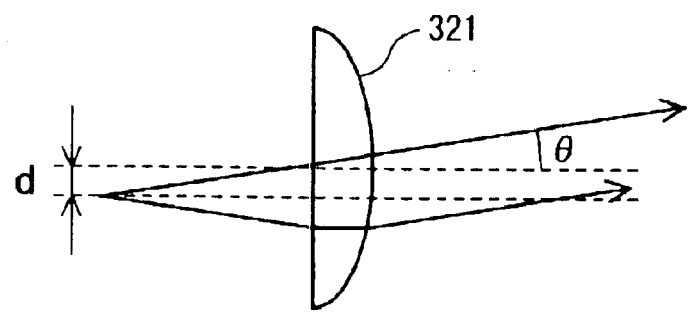
FIG. 3 is a schematic representation for describing the operation principle required for aligning an optical axis of the input-output optical system of the embodiment.

Here, the following relation exists between the light output from the optical fibers (or the light entering the optical fibers) and the collimated light. This relation signifies that the position and angle of the outgoing light can be changed by changing the relative position between the optical fibers 34 (44) and the collimating lenses 321. As schematically shown in, e.g., FIG. 3, the outgoing position and angle of the light output from the optical fibers can be (finely) adjusted, by means of moving only the positions of the collimating lenses 321 [lens block 32 (42)] within a single plane.

$$\begin{pmatrix} r_{out} \\ r'_{out} \end{pmatrix} = \begin{pmatrix} 1 & 0 \\ -1/f & 1 \end{pmatrix} \cdot \begin{pmatrix} r_{in} \\ r'_{in} \end{pmatrix}$$

$$r_{out} = r_{in}$$

$$r'_{out} = \frac{-r_{in}}{f} + r'_{in}$$

$r_{in}$: the position of light output from optical fibers,
$r'_{in}$: the angle of light output from optical fibers,
$r_{out}$: the outgoing position of collimated light,
$r'_{out}$: the angle of collimated light,
f: focal distance of a collimating lens For instance, the lens array block 32 (42) and the spacer 33 (43) are assembled into a single unit before being attached to the fiber block 31 (41). The axis of the light beam traveling between the input collimator 30 and the output collimator 40 can be aligned by means of moving the collimating lenses 321 while pressing the same against the fiber block 31 (41); namely, in a two-dimensional region within a single plate (e.g., the lenses are actuated vertically or horizontally or rotated). Consequently, highly-accurate and highly-stable optical axis alignment can be readily realized.

In the foregoing example, the input collimator 30 is provided with the spacer 33, and the output collimator 40 is provided with the spacer 43. However, omission of alignment in the direction of an optical path may be achieved by providing either the input collimator 30 or the output collimator 40 with a spacer.

The accuracy of the spacer 33 (43) can be improved by abrading the spacer up to a desired thickness. Further cost cutting can be achieved by combining together two transparent wedge-shaped plates 331, 332 (hereinafter called "wedge plates"). Here, FIG. 4 is a side view of the spacer 33 (43) when viewed in, e.g., the direction of the arrow A in FIG. 2B.

Figures 4A, 4B, 4C:
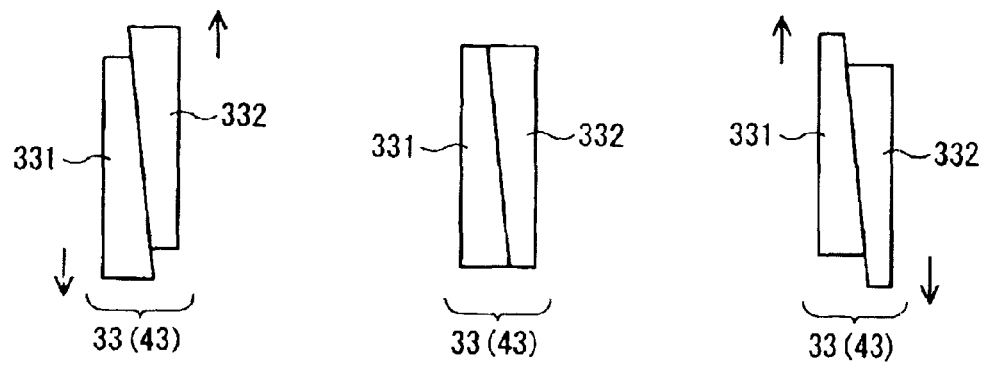
FIGS. 4A through 4C are views showing a modification of the spacer shown in FIG. 2B.

In this case, as schematically shown in FIGS. 4A and 4C, the wedge plates 331, 332 are slidably moved keeping in contact with each other in order to (minutely) adjust their relative positions vertically (in the direction of the arrow) such that a thickness corresponding to the focal distance of the collimating lenses 321 is achieved, thus adjusting the thickness of the spacer 33 (43).

Actual adjustment can be carried out by integrally bonding one of the wedge plates 331, 332 to the fiber block 31 (41) with a transparent adhesive, integrally bonding the remaining wedge plate to the lens array block 32 (42) with a transparent adhesive, and moving the lens array block 32 (42) while pressing the same against the wedge plate bonded to the fiber block 31 (41).

The distance over which the wedge plates 331, 332 are to travel at this time can be determined, by computing relative positions of the two wedge plates 331, 332 from inclinations thereof or by moving the wedge plates 331, 332 while the thickness of the spacer 33 (43) is measured with a thickness meter. After adjustment, the wedge plates 331, 332 are fixed with an adhesive.

When the transparent spacer 33 (43) is bonded to the fiber block 31 (41) with a transparent adhesive, light reflection can arise in a boundary surface. The light reflection is determined by a difference between the refractive index of a member to be employed and that of the adhesive. The refractive index of the spacer 33 (43), that of the collimating lenses 321, and that of the adhesive are made equal to that of the optical fibers 34 (44), thereby enabling a reduction in the amount of light reflected from the boundary surface; that is, the amount of attenuation in light beam due to reflected return light (i.e., the amount of loss in beam light).

Figure 5:
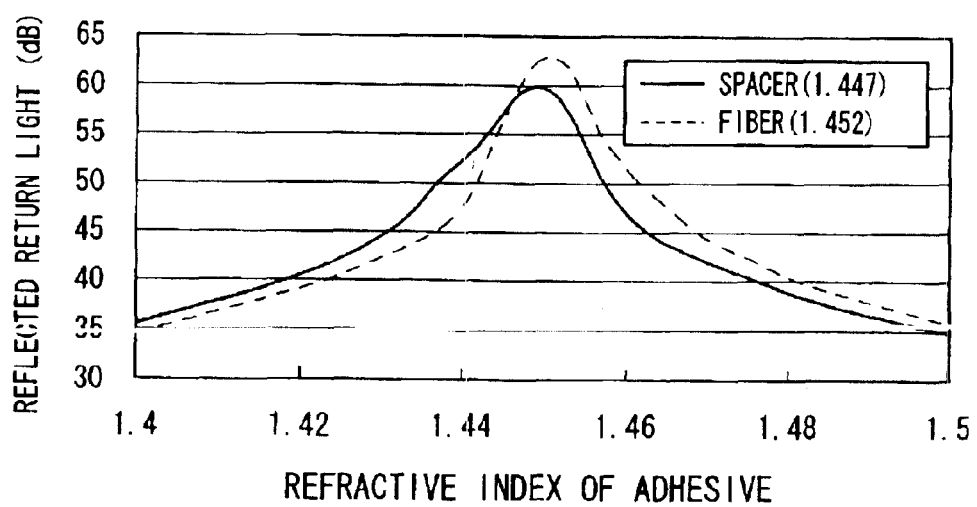
FIG. 5 is a graph showing a relationship between the refractive index of an adhesive and reflected return light in the embodiment.

For example, provided that the center wavelength of light propagating through the optical fibers 34 (44) assumes a value of about 1.3 μm and the refractive index of the optical fiber 34 (44) is 1.452, reflected return light can be effectively diminished by setting the refractive index of the transparent spacer 33 (43) as shown in FIG. 5, that of the collimating lens 321 (e.g., fused quartz), and that of a transparent adhesive to a value of about 1.447.

Figure 2B:
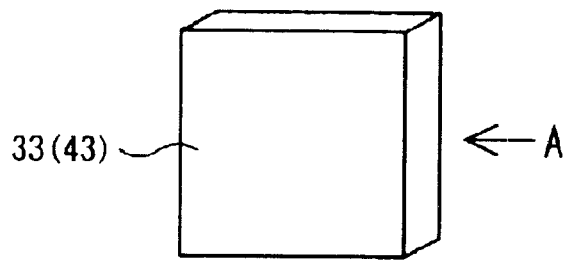
FIG. 2B is a schematic representation showing a transparent spacer to be used in the input-output optical system of the embodiment.

Here, when the U-shaped spacer 33 (43) [see FIG. 2A] is used, a space exists between the fiber block 31 (41) and the lens array block 32 (42), thereby causing a difference in refractive index. For instance, an end face of the fiber block 31 (41) is preferably provided with anti-reflection (AR) coating. Preferably, an AR-coated transparent plate is caused to adhere to the end face of the fiber block 31 (41), thereby preventing occurrence of reflected return light.

As mentioned above, the optical axis of the input-output optical system of the embodiment is adjusted by moving the lens array block 32 (42) horizontally or vertically within a single plane. If the amount of movement of the lens array block 32 has exceeded a tolerance, the light beam extends off the collimating lenses 321, thus inducing excessive loss.

In order to reduce the excessive loss, the mount position of the fiber block 31 (41) must be set to fall within a range in which the fiber block can be corrected by the collimating lenses 321. Hence, the mount accuracy of the fiber block 31 (41) must be enhanced.

Figure 6:
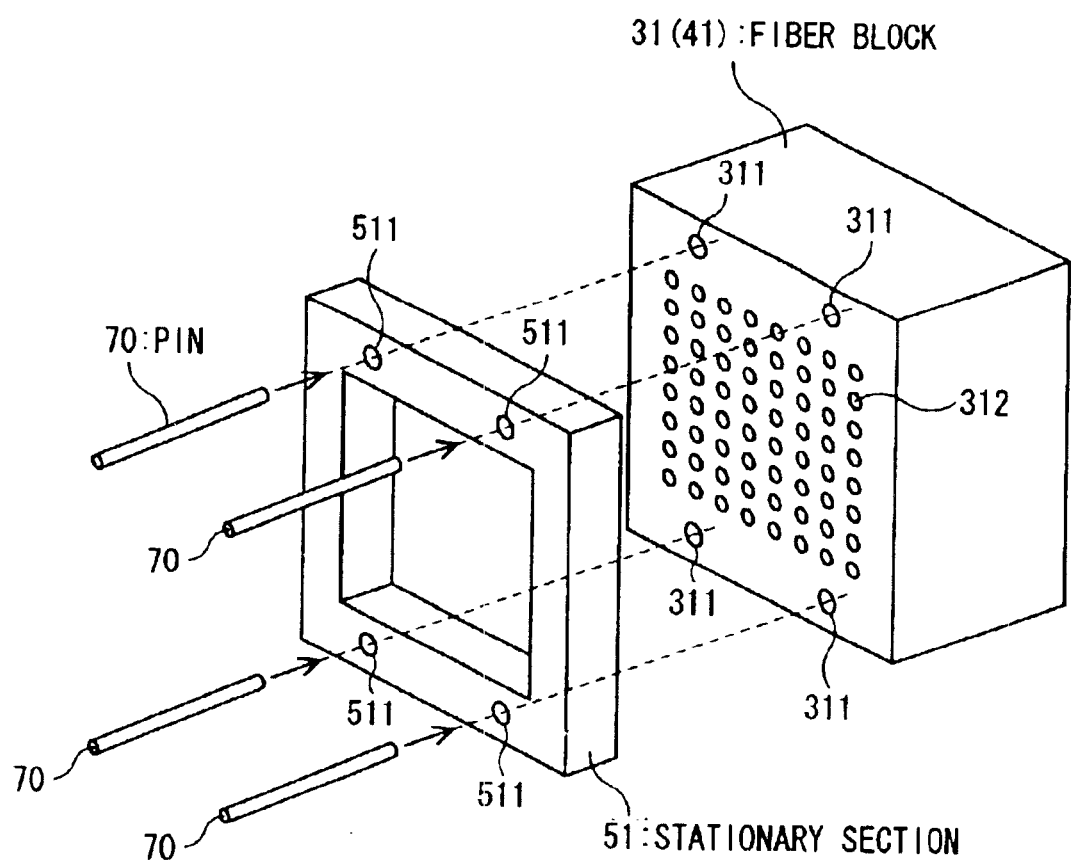
FIG. 6 is a schematic representation for describing a method of fastening a fiber block and a stationary section in the input-output optical system of the embodiment.

As schematically shown in, e.g., FIG. 6, a plurality of guide holes 511 for fitting purpose are formed in a stationary section 51 of the housing 50. A plurality of guide holes 311 are formed also in the fiber block 31 (41) so as to correspond to the guide holes 511. Temporarily-fixing pins (hereinafter called simply as "pins") 70 are inserted into the respective guide holes 311, 511 (positioning means), thereby fixing the fiber block 31 (41) to the stationary section 51. As a result, the fiber block 31 (41) can be fixed (temporarily fixed) to a predetermined position on the housing 50 while being readily and highly-accurately positioned. After the fiber block 3 has been fixed to the stationary section 51 by means of welding or the like, the pins 70 are removed.

As shown in FIG. 6, a member— in which holes 312 to be used for connection with (or insertion of) optical fibers (hereinafter called "fiber insertion holes") are formed highly accurately in an aligned manner— is used for the fiber block 31 (41). If the guide holes 311 to be used for mounting are also formed together with formation of the fiber insertion holes 312, the fiber insertion holes 312 and the guide holes 311 can be embodied highly accurately.

Realization of the above-described fitting and fixing operations is not limited to the foregoing technique. For instance, a plurality of protrusions are formed in the stationary section 51, and a plurality of recesses to be engaged with the protrusions are formed in the fiber block 31 (41). Conversely, there maybe employed a structure in which a plurality of recesses are formed in the stationary section 51; a plurality of protrusions are formed in the fiber block 31 (41); and the protrusions and indentations are fitted together without use of the pins 70.

Alternatively, there may also be employed a structure, in which protrusions or recesses are provided such that the respective protrusions or recesses surround the respective optical fiber insertion holes 312 of the fiber block 31 (41); recesses or protrusions, which are to be engaged with the protrusions or recesses, are formed in or on the stationary section 51; and the fiber block 31 (41) and the stationary section 51 are fitted together.

Figure 7:
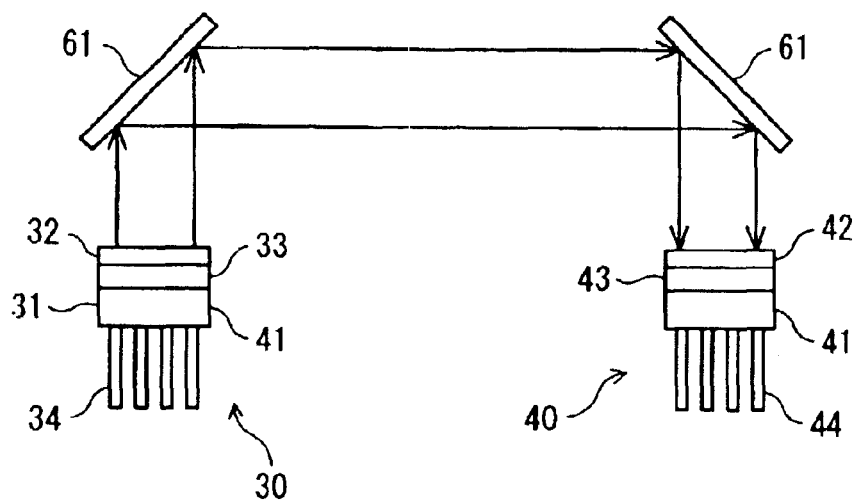
FIG. 7 is a schematic representation showing a modification of arrangement of input and output optical systems of the embodiment.

As schematically shown in, e.g., FIG. 7, a device which changes an optical path, such as mirrors 60, 61, is interposed between the input collimator 30 and the output collimator 40. In response to this, the layout of the input collimator 30 and the output collimator 40 is also changed. For instance, a corner mirror (a V-shaped mirror; a return mirror) 63—which shifts light beam output from the input collimator 30 to a predetermined direction, thus causing the light beam to return to the original direction—the input collimator 30, and the output collimator 40 are arranged on the housing 50 (not shown in FIG. 8), such that the surface by way of which the light beam is output from the input collimator 30 can be made coplanar with the surface by way of which the beam light reflected from the corner mirror 63 enters the output collimator 40.

Figure 8:
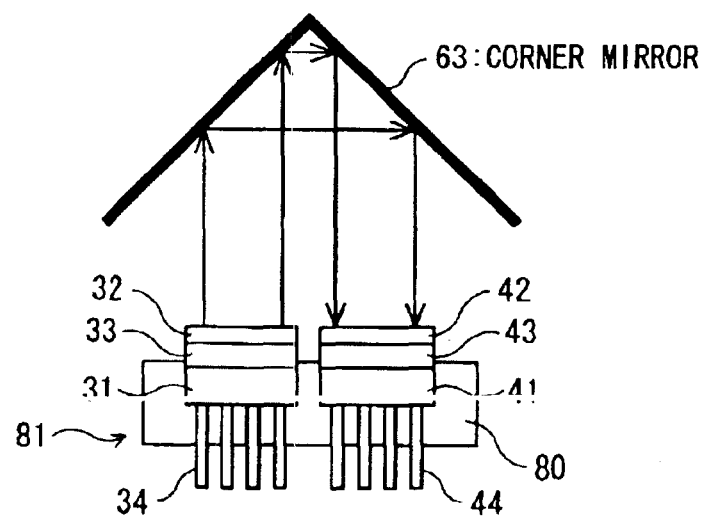
FIG. 8 is a schematic representation showing the structure of the input and output optical systems when the input and output systems of the embodiment are assembled into a single unit.

As shown in FIG. 8, the input collimator 30 and the output collimator 40 are mounted on a single mount board 80 or the like, whereby they can be assembled into an input-output-integrated fiber block 81. As compared with a case where the input collimator 30 and the output collimator 40 are handled separately, such an integration enables a significant improvement in the accuracy required to mount the collimators onto the housing 50 and further facilitation of alignment of an optical axis.

Since the tolerance (allowable error) of the corner mirror 63 is very loose, the corner mirror 63 can be positioned (or fixed) on the housing 50 by means of fitting. A triangular prism, two surfaces of which are provided with reflection coating, can be used for the corner mirror 63. As mentioned above, the number of processes for assembling a spatial optical switch to be described later can be reduced.

Figure 9A:
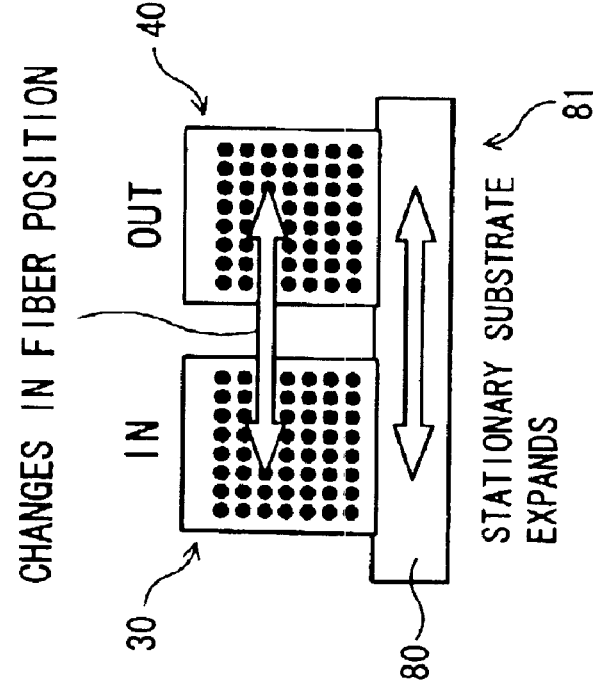
FIGS. 9A and 9B are schematic front views of a fiber block of input-output-integrated type of the embodiment.
Figure 9B:
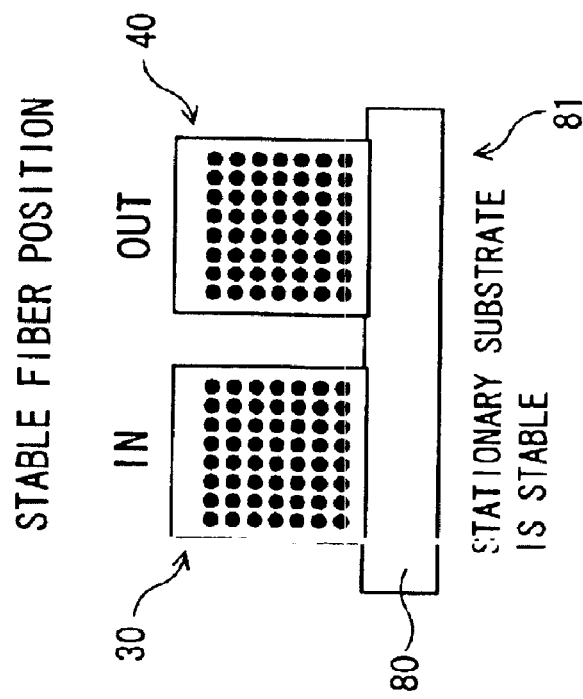

In this case, the amount of thermal expansion of the mount board 80 arising from temperature variations [see, for example, FIG. 9B] can be diminished by reducing a coefficient of thermal expansion of the mount board 80 on which the input collimator 30 and the output collimator 40 are to be mounted. For this reason, as schematically shown in, e.g., FIGS. 9A and 9B, variations in the positions of the fibers attributable to temperature variations can be stabilized. FIGS. 9A and 9B are schematic front views of an input-output-integrated type fiber block.

Deflection of the light outgoing from the input collimator 30 will now be described.

Figure 10A:
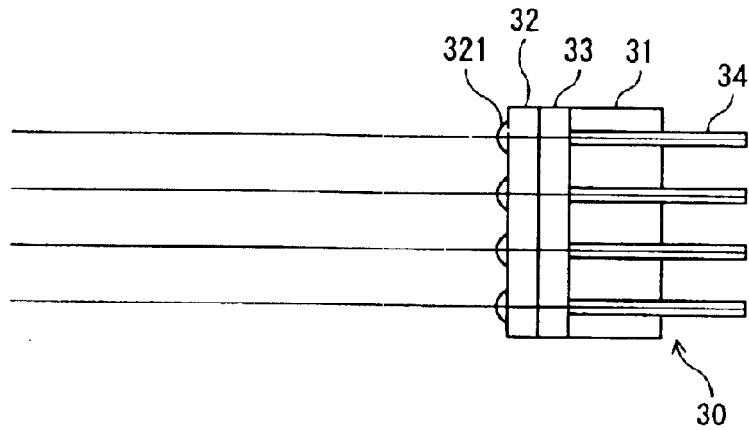
FIGS. 10A and 10B are schematic representations for describing deflection of light output from the input optical system of the embodiment.
Figure 10B:
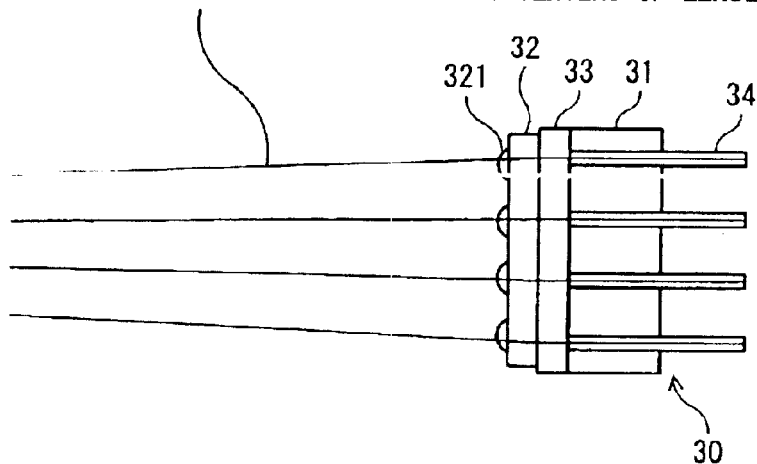

As mentioned previously, the angle of the light output from the input collimator 30 is determined by a positional relationship between the centers of the collimating lenses 321 and the optical fiber 34. When a match exists between the centers, as schematically shown in, e.g., FIG. 10A, collimated light is output in a direction of 0°. If an offset has arisen, the output angle of the collimated light becomes inclined (deflected) in accordance with the magnitude of the offset, as schematically shown in, e.g., FIG. 10B.

A factor responsible for such a deflection includes a difference between the amount of thermal expansion of the fiber block 31 and that of the lens array block 32, the difference being attributable to temperature variations. For example, if the coefficient of thermal expansion of the fiber block 31 and that of the lens array block 32 are made substantially equal to each other, the positional relationship between the centers of the optical fibers and the centers of the lenses can be made constant regardless of temperatures, thereby enabling a reduction in temperature variations of the angle of the light output from the collimator 30. Hence, the collimator 30 is very stable against thermal variations and, by extension, an input-output optical system can be realized.

The fiber block 31 having the same coefficient of thermal expansion as that of the lens array block 32 can be produced readily by forming, in a member (block) 313 having the same coefficient of thermal expansion as that of the lens array block 32, fiber insertion holes 312 for alignment (in the form of an array), each having a size larger than the diameter of an optical fiber, as schematically shown in, e.g., FIG. 11A; and forming resin (layer) 314 around the member 313 used as an insert member and along internal circumferences of the respective fiber insertion holes 312. FIG. 11C is a schematic view showing the block 313—which is shown in FIG. 11B and on which resin has been formed—when taken along a plane parallel to a column of fiber insertion holes 312.

Figure 12A:
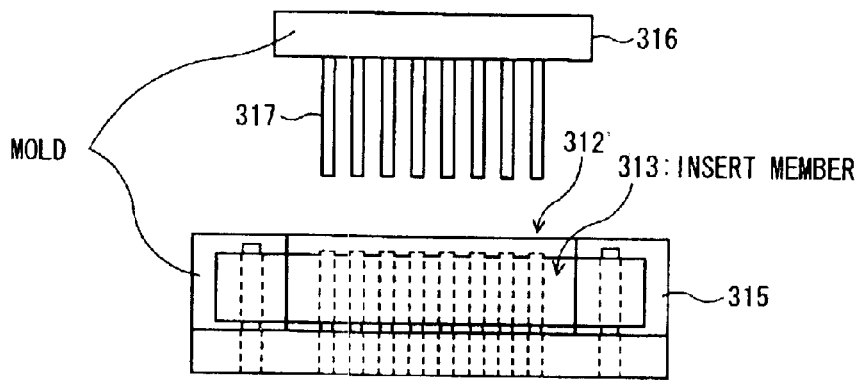
FIGS. 12A through 12C are schematic representations for describing processes for manufacturing the fiber block of the embodiment.
Figure 12B:
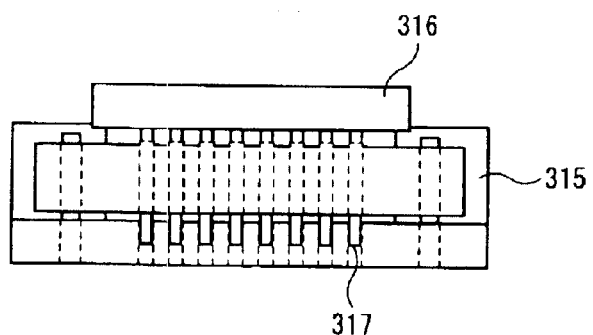
Figure 12C:
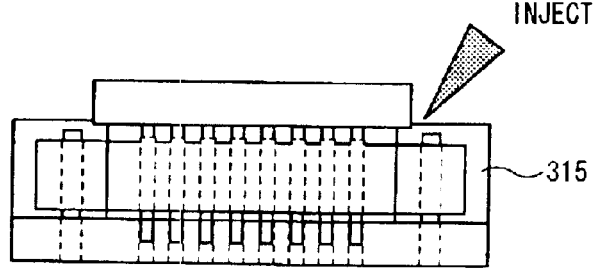

Specifically, the fiber block (alignment member) 31 can be produced through processes schematically shown in, e.g., FIGS. 12A through 12C.

First, as shown in FIG. 12A, an insert member (formed from metal) 313 in which holes 312' slightly greater than the size of an optical fiber are formed in equal number to optical fibers is fixed in a mold (housing) 315 for resin molding purpose. In this state, shaping pins 317 which are substantially identical in diameter with the optical fibers are provided on a mold 316 in equal number to the optical fibers. As shown in FIG. 12B, the mold 316 is inserted and fixed to the respective holes 312' of the insert member 313.

As shown in FIG. 12C, predetermined resin material is poured into the mold 315 in this state. After the thus-poured resin material has become set, the molds 315, 316 are removed, thereby producing the fiber block 31 (see FIGS. 11A to 11C) which has fiber insertion holes 312, each having the same diameter as that of the shaping pin 317, and whose circumference is coated with resin. The fiber block 41 can be produced in the same manner as that mentioned above.

More specifically, a combination of, e.g., fused quartz (having a coefficient of thermal expansion of $0.5 \times 10^{-6}/°$ C.) and INVAR (having a coefficient of thermal expansion of $1 \times 10^{-6}/°$ C.) can be conceived as a combination of the lens array block 32 and the insert member 313.

(B) Description of Spatial Optical Switch

The configuration of a spatial optical switch which uses the foregoing optical input-output optical system and serves as a spatially optical coupled device will now be described.

FIG. 13 is a perspective view schematically showing the configuration of an optical switch of spatially optical coupled type according to an embodiment of the invention. The optical switch shown in FIG. 13 (hereinafter called a "spatial optical switch") has the following structure. Namely, the input-output-integrated fiber block 81 is provided at a predetermined position on a horizontal surface section 50B of the housing 50, the housing having the shape of the letter L (i.e., the L-shaped housing). As mentioned previously, the input collimator 30 and the output collimator 40 are integrated into the fiber block 81 by means of the mount board 80. Further, the corner mirror 63 is provided at a predetermined position on a vertical surface section 50D of the housing 50. A tilt mirror array block 90 is provided at an intersection between the horizontal surface section 50B and the vertical surface section 50D. Angles formed between a slope section 90A of the tilt mirror array block 90, the horizontal surface section 50B, and the vertical surface section 50D are, e.g., 45°.

Input tilt mirrors 91 (designated by outlined circles in FIG. 13) are provided in the form of an array in the tilt mirror array block 90 so as to correspond to the arrangement of the collimating lenses 321, in equal in number to the input fiber 34 to be input to the input collimator 30 and output tilt mirrors 92 (designated by hatched circles in FIG. 13), which in turn are equal in number to a total number of output fibers to be inserted into the output collimator 40. The beam light output from the input collimator 30 is reflected to the corner mirror 63 by the input tilt mirrors 91. The light reflected from the corner mirror 63 is further reflected by the output tilt mirrors 92 to the output collimator 40. As a result, the beam light is transmitted across a space along an optical path designated by an arrow 93 in FIG. 13.

Known micro tilt mirrors manufactured by application of, e.g., the MEMS technique, can be used as the respective tilt mirrors 91, 92. In the micro tilt mirrors manufactured through use of the MEMS technique, the deflection angles of the mirrors can be variably controlled by integrally placing a movable plate—which is supported by a torsion bar and has a mirror formed on an upper surface thereof—integrally on a silicon substrate or the like, and moving the movable plate around the torsion bar by means of electromagnetic force.

The optical path 93 existing between the input collimator 30 (input optical fiber 34) and the output collimator 40 (output optical fiber 44) can be switched arbitrarily, by means of individually controlling the deflection angles of the tilt mirrors 91, 92. As a result, there can be embodied a spatial optical switch which enables optical cross-connection having a size corresponding to the number of tilt mirrors (i.e., 16×16 channels in FIG. 13).

In this spatial optical switch, the input collimator 30 and the output collimator 40 are assembled into a single unit as the input-output-integrated fiber block 81. Hence, mounting of optical components is very easy, and alignment of an optical axis can also be effected readily and with high accuracy in the manner mentioned above. Further, miniaturization of the spatial optical switch is also embodied. Therefore, an attempt to cut costs of a spatial optical switch can be made.

Figure 14:
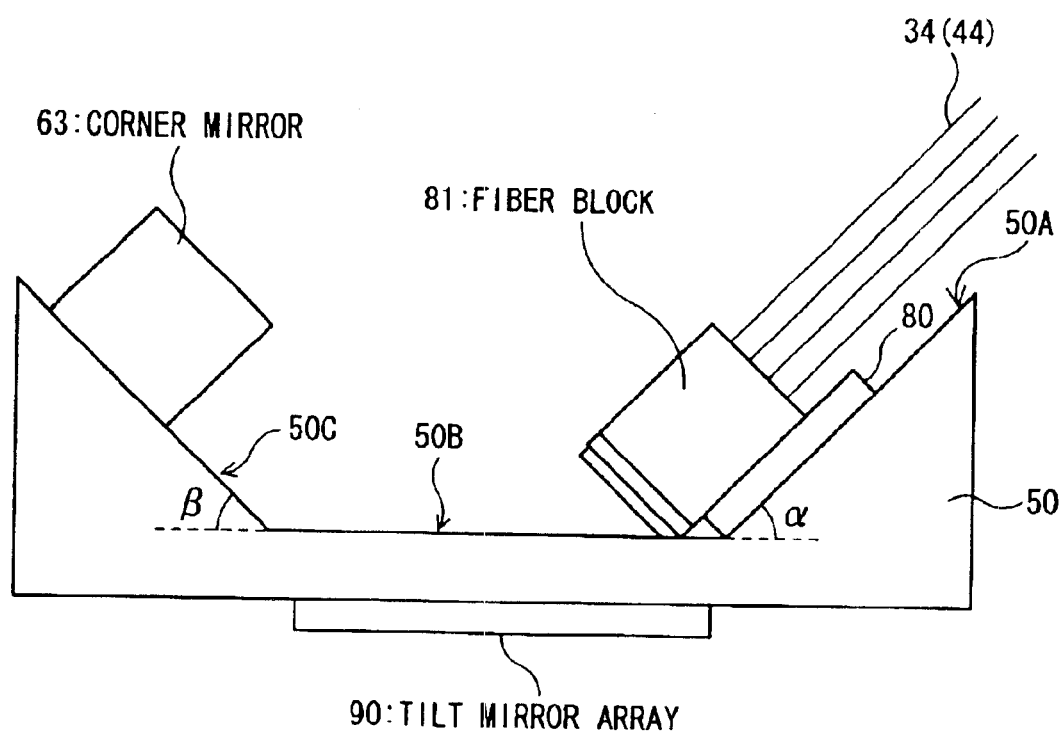
FIG. 14 is a schematic side view showing a modification of the optical switch of spatially optical coupled type using the input-output optical system of the embodiment.
Figure 15:
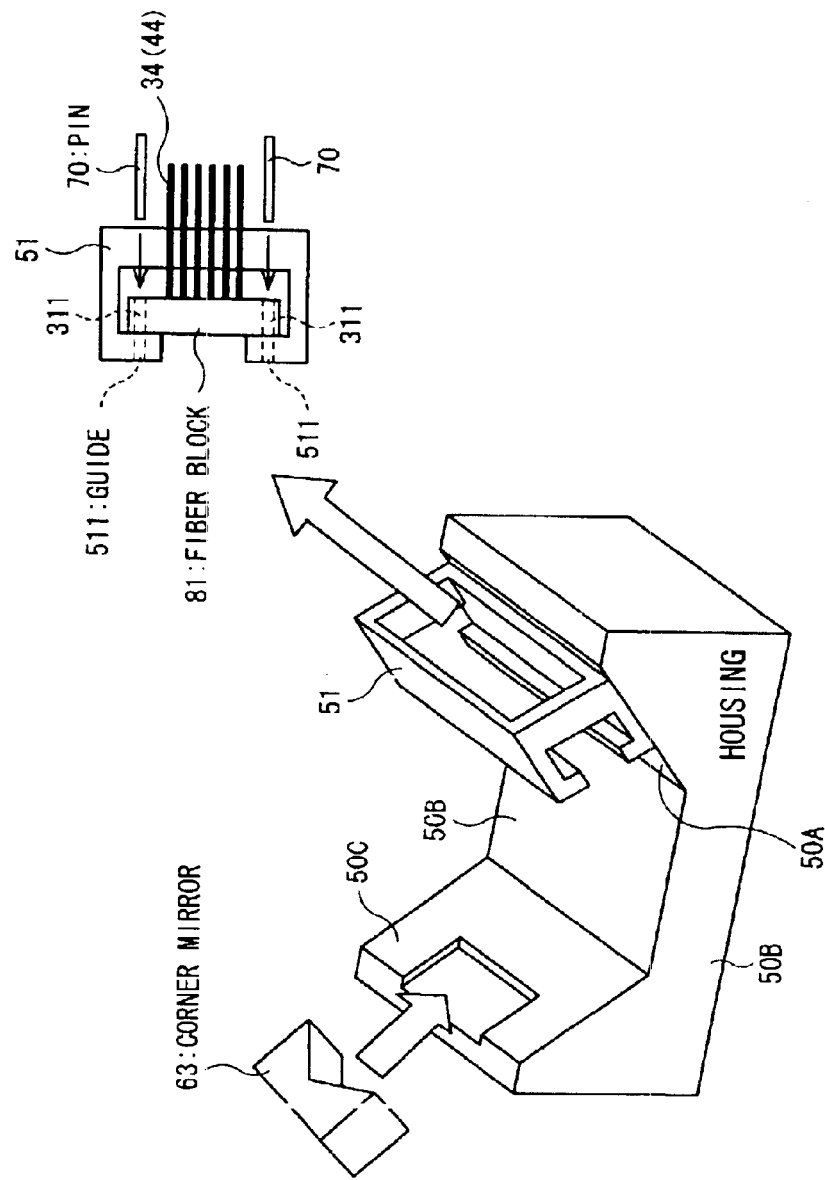
FIG. 15 is a schematic perspective view showing a modification of the optical switch of spatially optical coupled type using the input-output optical system of the embodiment.

The input-output-integrated fiber block 81, the corner mirror 63, and the tilt mirror array block 90 can also be arranged on the housing 50 in such a layout as that shown in, e.g., FIGS. 14 and 15. FIG. 14 is a schematic side view of the spatial optical switch, and FIG. 15 is a schematic perspective view of the spatial optical switch.

As shown in FIGS. 14 and 15, the input-output-integrated fiber block 81 is provided on a slope section 50A of a housing 50 having slope sections 50A, 50C and a horizontal section 50B. The corner mirror 63 is provided on the other slope section 50C. The tilt mirror array block 90 is placed on the horizontal surface section 50B. The angle α formed between the horizontal surface section 50B and the slope section 50A is, e.g., 45°, and the angle β formed between the horizontal surface section 50B and the slope section 50C is also, e.g., 45°. FIG. 15 omits illustration of the tilt mirror array block 90.

At this time, the input-output-integrated fiber block 81 is fixed by the same method as that described in connection with FIG. 6. As shown in FIG. 15, the input-output-integrated fiber block 81 is positioned on the stationary section 51 such that guide holes 511 of the stationary section 51 provided on the housing 50 are brought into mutual communication with the guide holes 311 formed previously in the input-output-integrated fiber block 81. The fixing pins 70 are inserted into and fixed to the guide holes 311, 511. Even in this case, as a matter of course, another fitting and fixing method such as that mentioned previously may also be employed.

Even the corner mirror 63 is placed by means of fitting and fixing operations such as those mentioned previously.

As a result of adoption of such a structure, the assembly of a spatial optical switch; that is, mounting (positioning and fixing) of the input-output-integrated fiber block 81 and the corner mirror 63 and alignment of an optical axis, can be performed readily. The spatial optical switch can be made more compact than that described in connection with FIG. 13. In this case, since the tilt mirror array block 90 is placed on the horizontal surface section 50B, gravity acts evenly on the respective tilt mirrors 91, 92 (movable plates). As compared with the structure shown in FIG. 13 (i.e., the surface on which the tilt mirrors 91, 92 are arranged is inclined), the spatial optical switch can readily and accurately control the deflection angle of the movable plate.

Figure 16A:
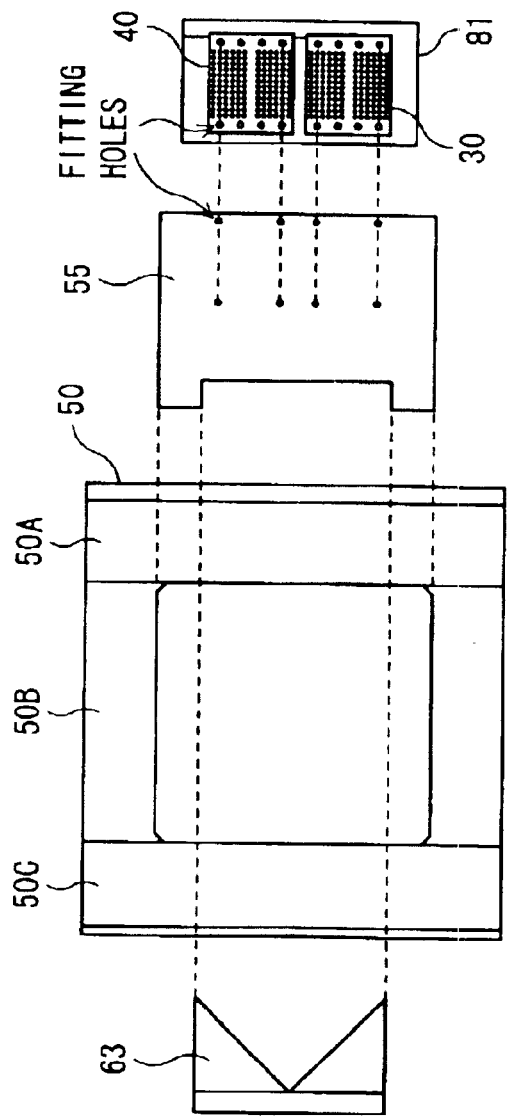
FIG. 16A is a schematic top view showing an optical switch before assembly, with a view to describing positioning and mounting of a corner mirror and a fiber block of input-output integrated type using a positioning jig in the optical switch of spatially optical coupled type shown in FIGS. 14 and 15.
Figure 16B:
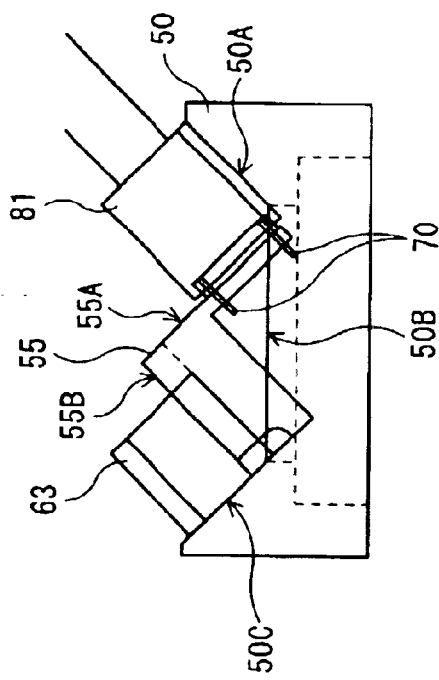
FIG. 16B is a side view showing the optical switch shown in FIG. 16A after assembly.
Figure 17:
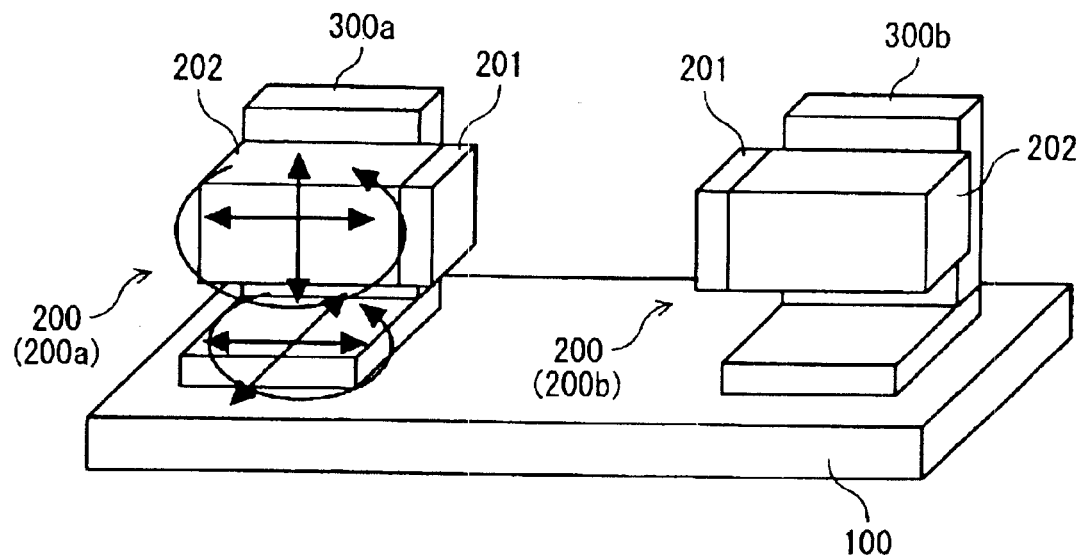
FIG. 17 is a view schematically showing an example of a conventional input-output optical system of three-dimensional mounting structure.
Figure 18A:
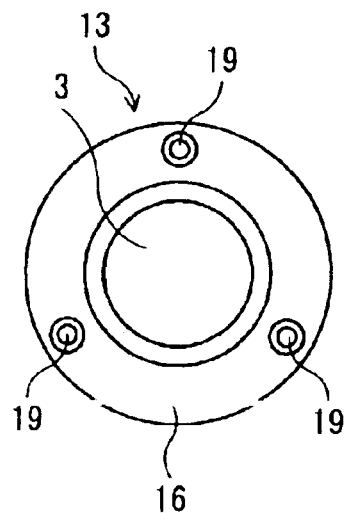
FIG. 18A is a front view of a conventional optical transmission unit.
Figure 18B:
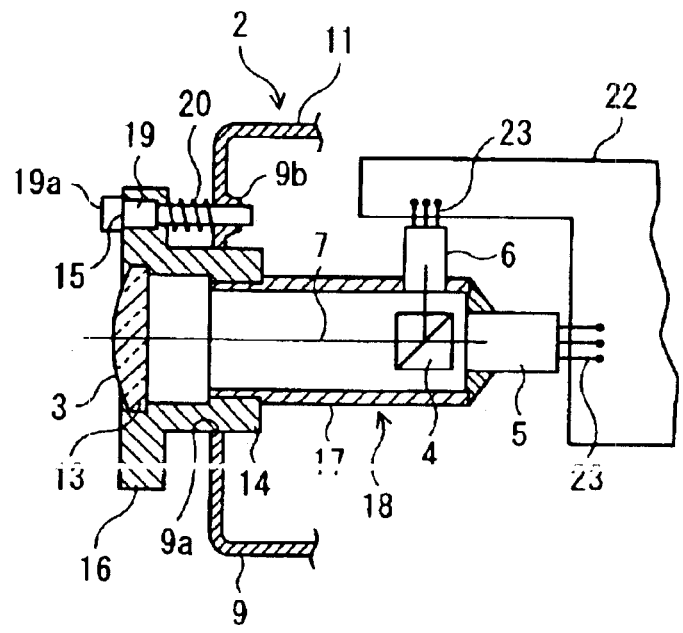
FIG. 18B is a transverse plan view of the conventional optical transmission unit.

In the spatial optical switch, the positional relationship (relative position) between the input-output-integrated fiber block 81 and the corner 63 is very important. Hence, as shown in, e.g., FIGS. 16A and 16B, mounting of these elements is preferably performed through use of a positioning jig 55. FIG. 16A is a top view showing the spatial optical switch before assembly; and FIG. 16B is a side view showing the spatial optical switch after assembly.

Here, the positioning jig (positioning member) 55 is used for temporarily positioning the corner mirror 63 and the input-output-integrated fiber block 81 on the housing 50. As shown in, e.g., FIG. 16B, the positioning jig 55 has an L-shaped geometry corresponding to a positional relationship on the housing 50 on which the corner mirror 63 and the input-output-integrated fiber block 81 are to be mounted.

A plurality of guide holes 551 for fitting purposes are formed on a surface section 55A so as to correspond to the guide holes 311 provided previously on the input-output-integrated fiber block 81 (i.e., the collimators 30, 40). The input-output-integrated fiber block 81 is placed while remaining in contact with the slope section 50A of the housing 50, by means of the positioning jig 55 such that the guide holes 511 of the input-output-integrated fiber block 81 serving as positioning means are brought in mutual communication with the guide holes 551 of the positioning jig 55. The pins 70 are inserted into the guide holes 311 and 511, thereby fitting and fixing (temporarily fixing) the input-output-integrated fiber block 81 to the positioning jig 55.

As a result, another surface section 55B of the positioning jig 55 is located at a position where the corner mirror 63 is to be arranged. Hence, if the corner mirror 63 is arranged (temporarily fixed) on the slope section 50C of the housing 50, the input-output-integrated fiber block 81 and the corner mirror 63 can be arranged accurately at a predetermined position.

If the input-output-integrated fiber block 81 and the corner mirror 63 are fixed to the housing 50 after temporary fixing by means of welding or the like, the pins 70 and the positioning jig 55 are removed.

As mentioned above, as a result of use of the positioning jig 55 at the time of mounting of the corner mirror 63 and the input-output-integrated fiber block 81 onto the housing 50, there is obviated a necessity for individually positioning the corner mirror 63 and the input-output-integrated fiber block 81, thereby enabling easy and accurate mounting of the spatial optical switch.

Needless to say, the invention is not limited to the above-described embodiment and is susceptible to various modifications within the scope of the invention.

What is claimed is:

1. An input-output optical system of spatially optical coupled type comprising:
   a substrate;
   an input optical system which is provided on the substrate and which has an input fiber block and an input lens array block, wherein a plurality of input optical fibers are connected to the input fiber block in an array, and a plurality of collimating lenses which collimate light input from the optical fibers connected to the input fiber block and output collimated light are arranged in the input lens array block in an array;
   an output optical system which is provided on the substrate and which has an output lens array block and an output fiber block, wherein a plurality of collimating lenses which collimate respective light rays output from the input lens array block are arranged in the output lens array block in an array, and the output fiber block to which a plurality of output optical fibers are connected in an array and which output the light output from the output lens array block to the output optical fibers; and
   a spacer which is interposed between the lens array block and the fiber block in at least one of the input and output optical systems without blocking an optical path for ensuring a distance corresponding to a focal distance of the collimating lenses and a distance of the optical path.

2. The input-output optical system of spatially optical connected type according to claim 1, wherein the spacer is formed from a plate-like transparent member which has a thickness corresponding to the focal distance and the distance of the optical path in a direction of the optical path and permits transmission of the light.

3. The input-output optical system of spatially optical connected type according to claim 2, wherein the plate-like transparent member has an optical refractive index corresponding to that of the input optical fibers or that of the output optical fibers, and the lens array block and the fiber block are cemented together with an adhesive having the same refractive index as that of the plate-like transparent member.

4. The input-output optical system of spatially optical connected type according to claim 3, wherein the plate-like transparent member is formed by combination of a plurality of transparent plates having wedge-shaped side surfaces such that a thickness in the direction of an optical path is changed as a result of sliding of the transparent plates.

5. The input-output optical system of spatially optical connected type according to claim 3, wherein a return mirror is further provided on the substrate for shifting light output from the input optical system to a predetermined direction, thus reflecting the light; and
   the input optical system and the output optical system are assembled into a single input-output-integrated block such that a surface of the input optical system by way of which the light is output and a surface of the output optical system by way of which the light reflected by the return mirror enters are located within a single plane.

6. The input-output optical system of spatially optical connected type according to claim 4, wherein a return mirror is further provided on the substrate for shifting light output from the input optical system to a predetermined direction, thus reflecting the light; and
   the input optical system and the output optical system are assembled into a single input-output-integrated block such that a surface of the input optical system by way of which the light is output and a surface of the output optical system by way of which the light reflected by the return mirror enters are located within a single plane.

7. The input-output optical system of spatially optical connected type according to claim 2, wherein the plate-like transparent member is formed by combination of a plurality of transparent plates having wedge-shaped side surfaces such that a thickness in the direction of an optical path is changed as a result of sliding of the transparent plates.

8. The input-output optical system of spatially optical connected type according to claim 7, wherein a return mirror is further provided on the substrate for shifting light output from the input optical system to a predetermined direction, thus reflecting the light; and
   the input optical system and the output optical system are assembled into a single input-output-integrated block such that a surface of the input optical system by way of which the light is output and a surface of the output optical system by way of which the light reflected by the return mirror enters are located within a single plane.

9. The input-output optical system of spatially optical connected type according to claim 2, wherein a return mirror is further provided on the substrate for shifting light output from the input optical system to a predetermined direction, thus reflecting the light; and
   the input optical system and the output optical system are assembled into a single input-output-integrated block such that a surface of the input optical system by way of which the light is output and a surface of the output optical system by way of which the light reflected by the return mirror enters are located within a single plane.

10. The input-output optical system of spatially optical connected type according to claim 1, wherein the spacer is formed from a plate-like member which has a thickness corresponding to the focal distance and the distance of the optical path in a direction of the optical path, so as to avoid hindering the optical path in accordance with the arrangement of the collimating lenses.

11. The input-output optical system of spatially optical connected type according to claim 10, wherein a return mirror is further provided on the substrate for shifting light output from the input optical system to a predetermined direction, thus reflecting the light; and the input optical system and the output optical system are assembled into a single input-output-integrated block such that a surface of the input optical system by way of which the light is output and a surface of the output optical system by way of which the light reflected by the return mirror enters are located within a single plane.

12. The input-output optical system of spatially optical connected type according to claim 1, wherein the substrate and the fiber block are provided with positioning means for fixing the fiber block at a predetermined position on the substrate.

13. The input-output optical system of spatially optical connected type according to claim 12, wherein a return mirror is further provided on the substrate for shifting light output from the input optical system to a predetermined direction, thus reflecting the light; and the input optical system and the output optical system are assembled into a single input-output-integrated block such that a surface of the input optical system by way of which the light is output and a surface of the output optical system by way of which the light reflected by the return mirror enters are located within a single plane.

14. The input-output optical system of spatially optical connected type according to claim 1, wherein a return mirror is further provided on the substrate for shifting light output from the input optical system to a predetermined direction, thus reflecting the light; and the input optical system and the output optical system are assembled into a single input-output-integrated block such that a surface of the input optical system by way of which the light is output and a surface of the output optical system by way of which the light reflected by the return mirror enters are located within a single plane.

15. The input-output optical system of spatially optical connected type according to claim 14, wherein the return mirror is fittingly fixed at a predetermined position on the substrate.

16. The input-output optical system of spatially optical connected type according to claim 14, wherein the input-output-integrated block is provided with a positioning member for temporarily positioning the return mirror and the input-output-integrated block on the substrate, and positioning means to be fixed at a predetermined position.

17. The input-output optical system of spatially optical connected type according to claim 1, wherein the fiber block and the lens array block are formed from material having identical coefficients of thermal expansion.

18. The input-output optical system of spatially optical connected type according to claim 11, wherein the fiber block is constituted of a metal insert member in which a plurality of hole sections corresponding to the arrangement are formed and have a coefficient of thermal expansion equal to that of the lens array block; and resin material which covers the insert member.

19. An input-output optical switch of spatially optical coupled type comprising:

a substrate;

an input optical system which is provided on the substrate and which has an input fiber block and an input lens array block, wherein a plurality of input optical fibers are connected to the input fiber block in an array, and a plurality of collimating lenses which collimate light input from the optical fibers connected to the input fiber block and output collimated light are arranged in the input lens array block in an array;

an output optical system which is provided on the substrate and which has an output lens array block and an output fiber block, wherein a plurality of collimating lenses which collimate respective light rays output from the input lens array block are arranged in the output lens array block in an array, and the output fiber block to which a plurality of output optical fibers are connected in an array and which output the light output from the output lens array block to the output optical fibers;

a spacer which is interposed between the lens array block and the fiber block in at least one of the input and output optical systems without blocking an optical path for ensuring a distance corresponding to a focal distance of the collimating lenses and a distance of the optical path; and a tilt mirror array block for effecting switching of an optical path existing between the input optical system and the output optical system.

* * * * *